(12) United States Patent
Hachtmann et al.

(10) Patent No.: US 9,156,565 B2
(45) Date of Patent: Oct. 13, 2015

(54) METHODS FOR PERCHING

(71) Applicant: Google Inc., Mountain View, CA (US)

(72) Inventors: Brian Hachtmann, San Martin, CA (US); Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 14/144,159

(22) Filed: Dec. 30, 2013

(65) Prior Publication Data
US 2015/0183527 A1 Jul. 2, 2015

(51) Int. Cl.
*B64F 1/00* (2006.01)
*B64F 1/12* (2006.01)

(52) U.S. Cl.
CPC .................................... *B64F 1/12* (2013.01)

(58) Field of Classification Search
CPC ............... B64F 1/02; B64F 1/08; B64F 1/12; B64F 1/14; B64F 3/00; F03D 11/04; B64C 31/06; B64C 39/022; B64C 2201/148; B64C 2201/182
USPC .......... 244/110 E, 110 G, 154, 155 R; 290/55
See application file for complete search history.

(56) References Cited

U.S. PATENT DOCUMENTS

| 7,504,741 B2 | 3/2009 | Wrage et al. |
| 7,672,761 B2 | 3/2010 | Wrage et al. |
| 7,971,545 B2 | 7/2011 | Wrage |
| 8,056,490 B2 | 11/2011 | Wrage |
| 2010/0013236 A1 | 1/2010 | Carroll |
| 2010/0032948 A1 | 2/2010 | Bevirt |
| 2010/0295303 A1 | 11/2010 | Lind et al. |
| 2011/0101692 A1 | 5/2011 | Bilaniuk |
| 2011/0260462 A1 | 10/2011 | Vander Lind |
| 2012/0104763 A1 | 5/2012 | Lind |
| 2012/0248770 A1 | 10/2012 | Byun |
| 2013/0221154 A1 | 8/2013 | Vander Lind et al. |
| 2013/0221679 A1* | 8/2013 | Vander Lind .................. 290/55 |

FOREIGN PATENT DOCUMENTS

WO   2013/156680   10/2013

OTHER PUBLICATIONS

Makani Power, "How does it work?" http://makanipower.com/how-does-it-work, accessed Nov. 1, 2013, 3 pages.
Makani Power, "What is Airborne Wind Power?" http://makanipower.com/what-is-airborne-wind, accessed Nov. 1, 2013, 2 pages.

* cited by examiner

*Primary Examiner* — Timothy D Collins
*Assistant Examiner* — Richard G Davis
(74) *Attorney, Agent, or Firm* — McDonnell Boehnen Hulbert & Berghoff LLP.

(57) ABSTRACT

An airborne wind turbine system including an aerial vehicle having a fuselage, an electrically conductive tether having a first end secured to the aerial wing and a second end secured to a platform, a rotatable drum positioned on the platform onto which the tether is wrapped when the aerial vehicle is reeled in, a perch panel extending from the platform, first and second extensions extending from opposite sides of the perch panel, a peg positioned on the fuselage, first and second hooks extending from the aerial vehicle on opposite sides of the peg, wherein when the aerial vehicle is perched on the perch panel, the peg is in contact with the perch panel, the first hook is positioned over the first extension, and the second hook is positioned over the second extension.

25 Claims, 14 Drawing Sheets

METHODS FOR PERCHING

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

An airborne wind turbine system is provided that includes a perching system that enables safe, secure and stable landing of an aerial vehicle onto a perch, and a secure final perch using a simplified perch system that provides significant advantages in terms of limiting movement at the point of contact between the aerial vehicle and the perch and providing restoring forces to properly center the vehicle on the perch. The airborne wind turbine system includes an aerial vehicle having a fuselage, an electrically conductive tether having a first end secured to the aerial vehicle and a second end secured to a platform positioned on a tower, a perch panel extending from the platform, first and second extensions extending from opposite sides of the perch panel, a peg positioned on the fuselage, first and second hooks extending from the aerial vehicle on opposite sides of the peg, wherein when the aerial vehicle is perched on the perch panel, the peg is in contact with the perch panel, the first hook is positioned over the first extension, and the second hook is positioned over the second extension.

In another aspect, an airborne wind turbine system is provided including an aerial vehicle having a fuselage, an electrically conductive tether having a first end secured to the aerial vehicle and a second end secured to a platform, a rotatable drum positioned on the platform onto which the tether is wrapped when the aerial vehicle is reeled in, a perch panel extending from the platform, a first extension extending from a first side of the perch panel, a second extension extending from a second side of the perch panel, a peg positioned on the fuselage, a first hook extending from the aerial vehicle on a first side of the peg, a second hook extending from the aerial vehicle on a second side of the peg opposite the first side, wherein when the aerial vehicle is perched on the perch panel, the peg is in contact with the perch panel, the first hook is positioned over the first extension, and the second hook is positioned over the second extension.

In a further aspect, an aerial vehicle for use in an airborne wind turbine system is provided including a main wing, a fuselage attached to the main wing, a peg positioned on the fuselage, a first hook extending from the aerial vehicle on a first side of the peg, a second hook extending from the aerial vehicle on a second side of the peg opposite the first side, wherein the peg is adapted for contacting a perch panel extending from a platform when the aerial vehicle is a perched position, wherein the first hook is adapted for positioning on a first extension extending from a first side of the perch panel when the aerial vehicle is in the perched position; and wherein the second hook is adapted for positioning on a second extension extending from a second side of the perch panel when the aerial vehicle is in the perched position.

In another aspect, a perching system for use in an airborne wind turbine system is provided including a perch platform, a perch panel extending from the perch platform, a first extension extending from a first side of the perch panel, a second extension extending from a second side of the perch panel, wherein the perch panel is adapted to contact a peg extending from an aerial vehicle when the aerial vehicle is in a perched position, wherein the first extension is adapted to contact a first hook extending from the aerial vehicle on a first side of the peg when the aerial vehicle is in the perched position, and wherein the second extension is adapted to contact a second hook extending from the aerial vehicle on a second side of the peg opposite the first side, when the aerial vehicle is in the perched position.

In another aspect, a method is provided of landing an aerial vehicle in an airborne wind turbine system having an aerial vehicle having a fuselage, an electrically conductive tether having a first end secured to the aerial vehicle and a second end secured to a platform, a rotatable drum positioned on the platform onto which the tether is wrapped when the aerial vehicle is reeled in, a perch panel extending from the platform, where the platform is positioned on a tower, comprising the steps of positioning a peg on the fuselage, extending a first panel extension from a first side of the perch panel, extending a second panel extension from a second side of the perch panel, positioning a first hook extending from the aerial vehicle on a first side of the peg, positioning a second hook extending from the aerial vehicle on an second side of the peg opposite the first side, reeling in the tether onto the rotatable drum until the peg comes into contact with the perch panel; and descending the aerial vehicle until the first hook comes into contact with the first extension and the second hook comes into contact with the second extension.

In another aspect, a means for landing an aerial vehicle on a perch is provided.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9 shows a side view of aerial vehicle 120 perched on perch panel 160 attached to ground station 150 as shown in FIG. 3, further including a truss 190 with shock absorbing device 198 positioned beneath perch support 170a.

DETAILED DESCRIPTION

Figure 1:
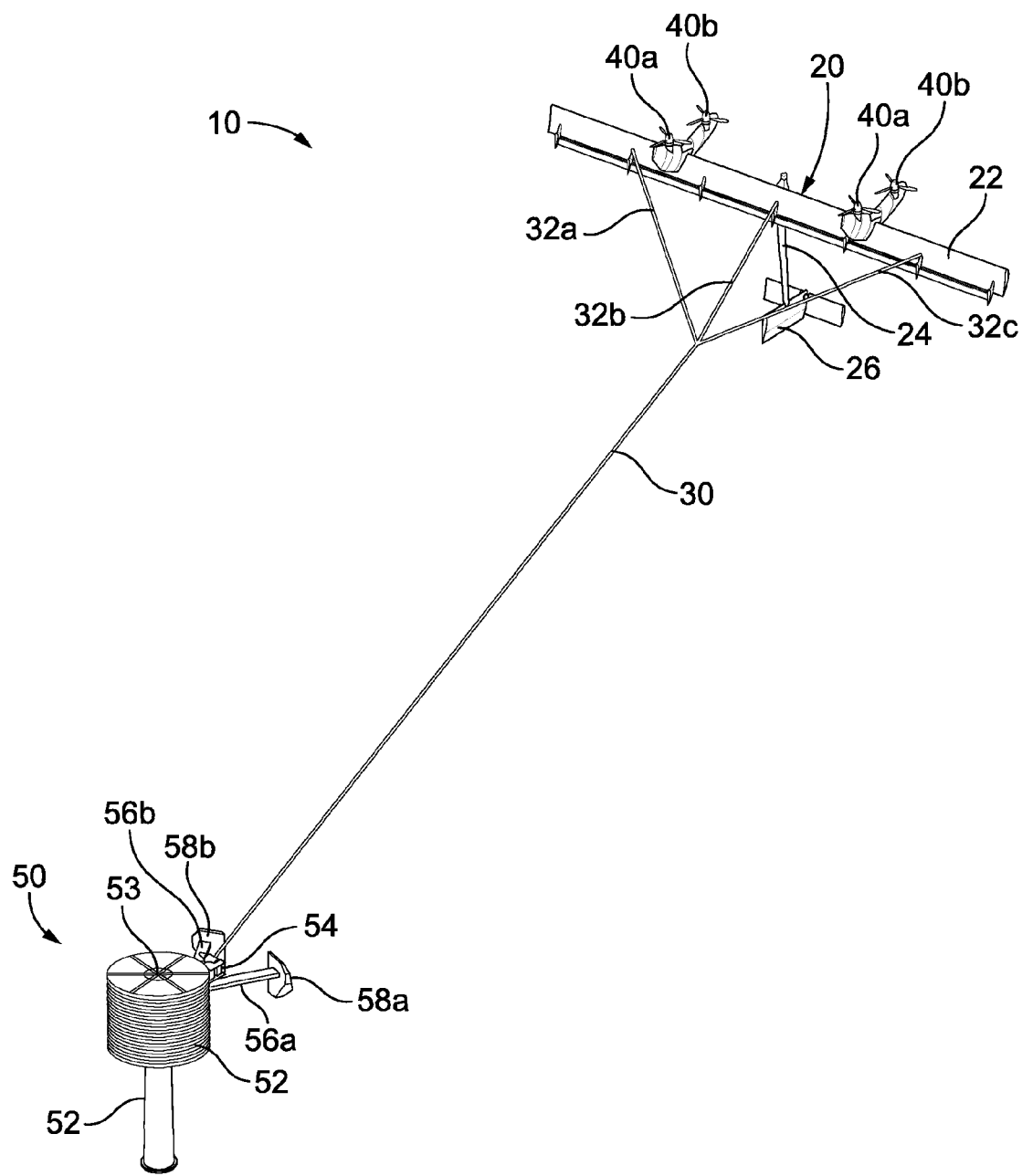
FIG. 1 is a perspective view of an airborne wind turbine 10 including aerial vehicle 20 attached to a ground station 50 with an electrically conductive tether 30, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to the grid.

When it is desired to land the aerial vehicle, the electrically conductive tether may be wound onto a spool or drum in the ground station, which reels in the aerial vehicle towards a perch on the ground station. Prior to landing on the perch, the aerial vehicle may transition from a flying mode to a hover mode. After the aerial vehicle transitions to hover mode, the tether may be wound onto the drum until the aerial vehicle comes to rest on the perch.

The perch for the aerial vehicle should provide a reliable, safe place to store the aerial vehicle when it is not in use. In windy conditions, the perch should be able to maintain a desired positioning of the aerial vehicle on the perch. Furthermore, during landing of the aerial vehicle on the perch there could be undesirable pitching, rolling, or yawing of the aerial vehicle (caused by gusts of wind for example) while the aerial vehicle is contact with the perch, but before the aerial vehicle is fully landed on the perch. During this critical period it would be desirable for the perch to provide a restoring force to center the aerial vehicle on the perch.

Furthermore, in the event of pitch, roll, or yaw of the aerial vehicle it would be desirable for there to be very little movement of the aerial vehicle at a point of contact between the aerial vehicle and perch, to provide greater stability to aerial vehicle/perch interaction.

In an example embodiment, a perch panel that extends from an airborne wind turbine is provided. The perch panel includes a first side and a second side that are joined together along their respective inner edges. The aerial vehicle may be viewed as sitting on a sphere when positioned on the perch panel. The first and second sides of the perch panel may be formed as disparate surface sections of a sphere that have been brought into contact to provide a vertically oriented V-shaped groove having a bottom where the inner edges of the first and second sides of the perch panel are joined.

The perch panel is supported by one or more perch panel support members that extend horizontally from a perch platform positioned on the ground station. The perch panel platform may rotate about the top of the ground station tower so that the perch panel is in proper position when the aerial vehicle is landing.

The aerial vehicle includes a peg that extends from the fuselage of the aerial vehicle. When the aerial vehicle is in hover mode during landing, the peg extends downwardly and outwardly from the fuselage towards the perch panel. The perch panel may be aligned with the tether being wound onto a rotatable drum such that the perch panel faces the fuselage of the aerial vehicle when it is landing. For example, if a drum rotatable about a horizontal axis is used, the perch platform could be coupled to the drum such that the perch platform extends perpendicularly from the axis of the drum and the tether is wound onto the drum over the perch panel. In this manner as the tether is wound onto the drum, the perch panel will always face the aerial vehicle and be in position to receive the peg on the fuselage of the aerial vehicle. In fact, the drum could be positioned on the perch platform such that the tether (or center tether bridle) extends over the bottom of the groove of the perch panel.

The peg may be positioned on the center of the fuselage extending beneath the center tether bridle during landing. As the tether is further wound onto the drum, the bottom of the peg comes into contact with the perch panel. The curved, spherical surface sections of the first and second sides of the perch panel form a groove and the force of the peg against the perch panel forces the end of the peg down the curved surface of the side of the panel and into the bottom of the groove. Thus, the peg may not initially contact the bottom of the groove as the aerial vehicle is landing. Instead, the peg may initially come into contact with the first or second side of the perch panel. The force of the tether pulling on the fuselage and the peg pressure against the panel resultant of the pitching moment created by the propellers of the aerial vehicle will cause the peg to move across the curved surface of the side of the perch panel it initially contacted and move down the curved surface into the bottom of the groove on the perch panel.

The peg is preferably located at or near the center of gravity of the aerial vehicle, such as at a point located at near the intersection of the axes of pitch, roll, and yaw. As a result, there will be little or no movement of the peg during pitch, roll, or yaw of the aerial vehicle. Therefore, there will be little or no movement of the aerial vehicle at its point of contact with the perch panel.

A bar, such as a T-bar may extend from both sides of the perch panel. A pair of hooks may be attached to the aerial wing, positioned on opposite sides of the peg. Each hook may be located at a point equidistant from the peg. The hooks may be positioned on the wing or on the pylons that attach the rotors to the wing of the aerial vehicle. As the aerial vehicle descends during landing, the peg moves downwardly into contact with the bottom of the groove of the perch panel. As the aerial vehicle further descends, the hooks come into contact with the sides of the T-bar and ultimately rest on top of the sides of the T-bar when the aerial vehicle is perched.

Once the aerial vehicle comes into a final resting place, there are four points of contact between the aerial vehicle and the ground station to provide a stable final perch for the aerial vehicle. In particular, the tether remains attached to the wing and the bridle exerts a force on the vehicle pulling the vehicle towards the ground station. At the same time the perch panel exerts a force against the peg holding the aerial vehicle tightly to the ground station. Further, the T-bar contacts the hooks preventing the top of the aerial vehicle from pitching towards the ground station. The weight of the aerial vehicle concentrated at the points of contact between the pair of hooks on the sides of the T-bar prevent the yawing or rolling of the aerial vehicle in its final perched position.

During the critical period between initial contact of the peg with the perch panel and the contact between the pair of hooks and the sides of the T-bar, if there are windy, or gusty conditions, pitching or yawing of the aerial vehicle may be controlled during this critical period with the propellers of the rotors. For example, more or less power from the right or left rotors could be used to control yaw and more or less power from the lower or upper rotors could be used to control pitch.

In addition, in some embodiments it may be desirable to provide a more compliant perch system. In particular, if the aerial vehicle comes in for a "hard landing" it may be desirable for the perch panel to absorb the energy from the aerial vehicle during such a hard landing. Thus, an extremely rigid perch panel system may not be desirable. To provide for a more compliant perch system, the perch panel may be supported by one or more cantilevered beams, so that the perch panel is not supported underneath. The cantilevered beams may flex somewhat upon impact to absorb energy during a hard landing.

However, additional cushioning may also be provided in the perch panel system. For example, a truss or beam could extend beneath one or more perch support members that is rotatable with the perch platform. One or more shock absorbers may be positioned between the top of the truss and the bottom of the one or more support members to provide for further cushioning during a hard landing.

2. ILLUSTRATIVE AIRBORNE WIND TURBINES

Figure 2:
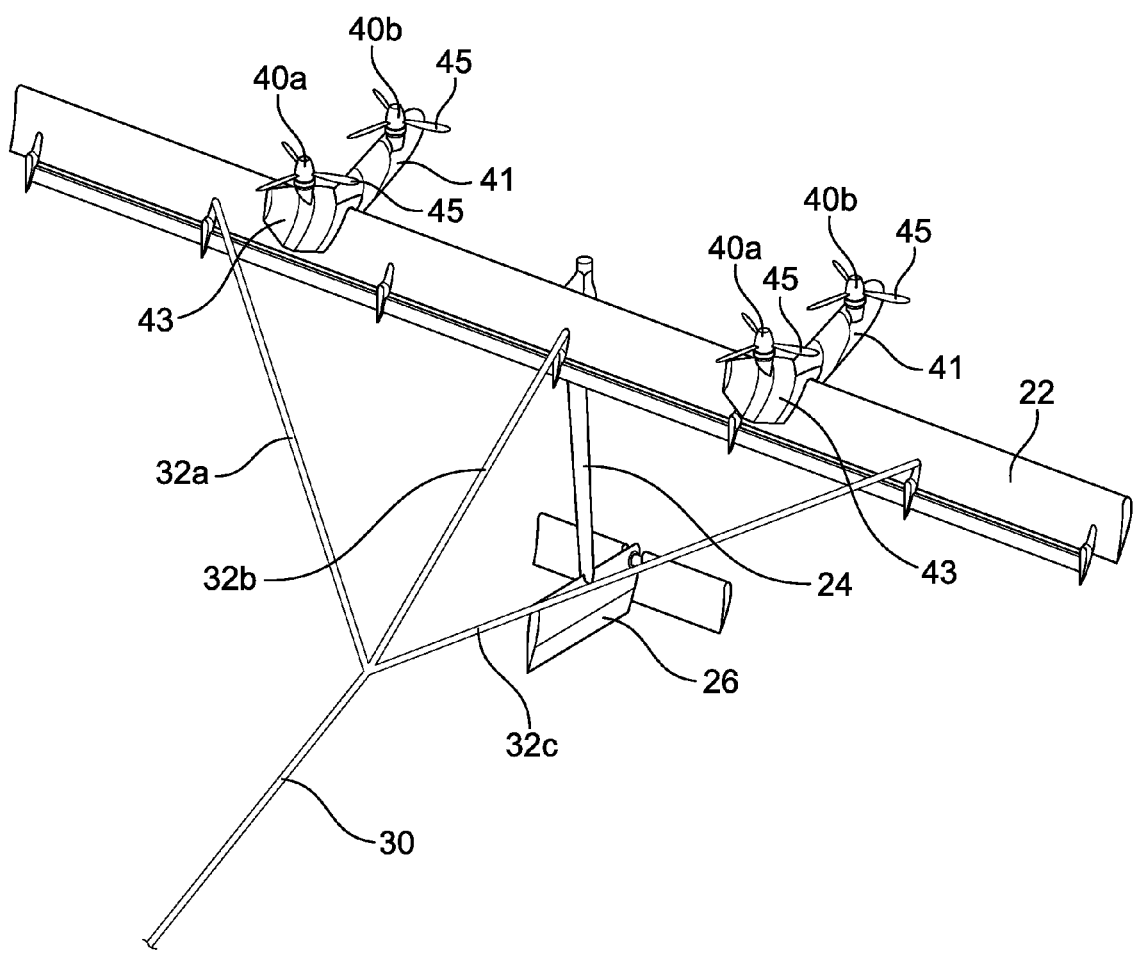
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridal 32a, 32b, and 32c. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform or a boat, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3:
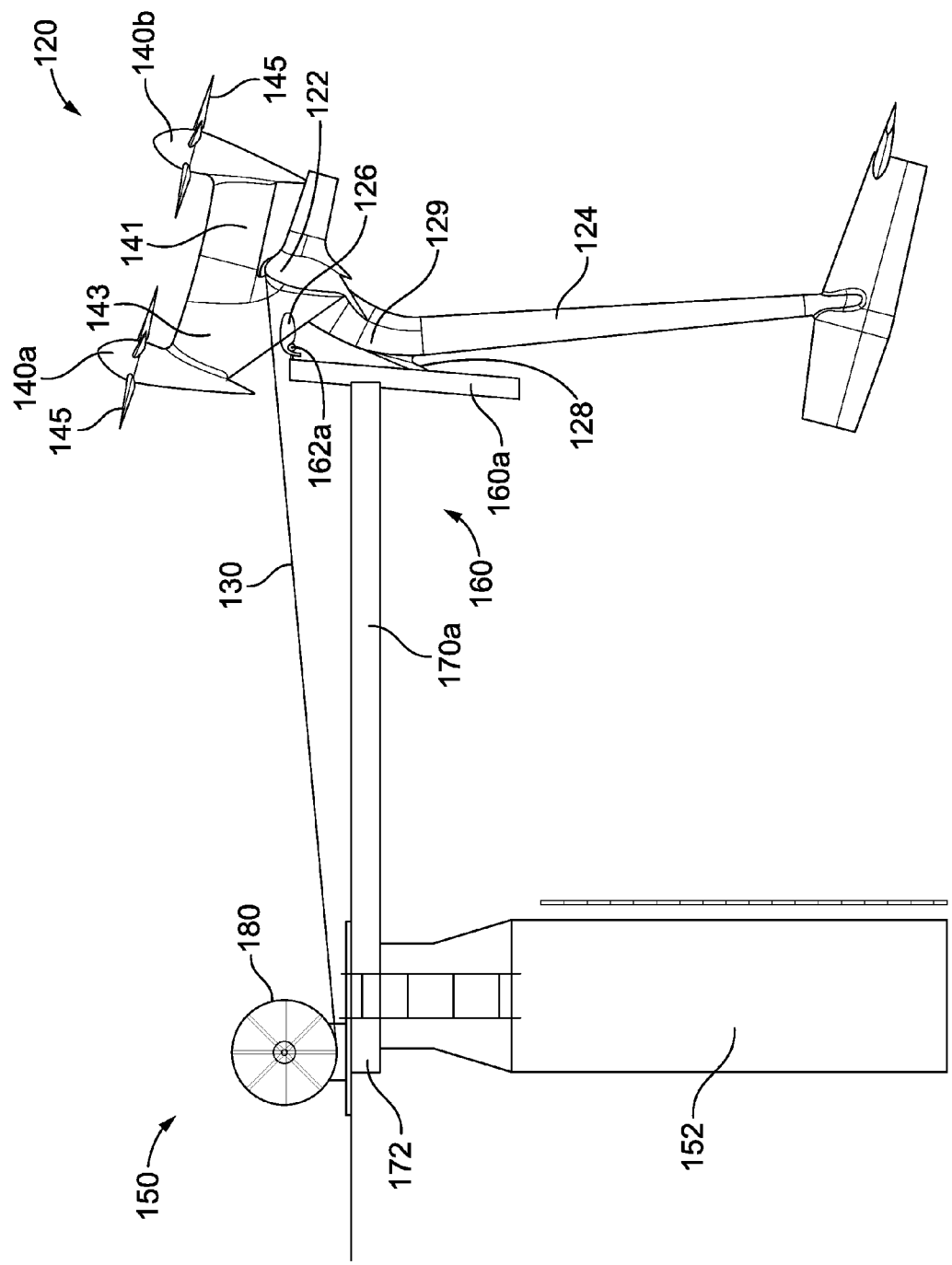
FIG. 3 is a side view of aerial vehicle 120 perched on perch panel 160 attached to ground station 150, according to an example embodiment.
Figure 4:
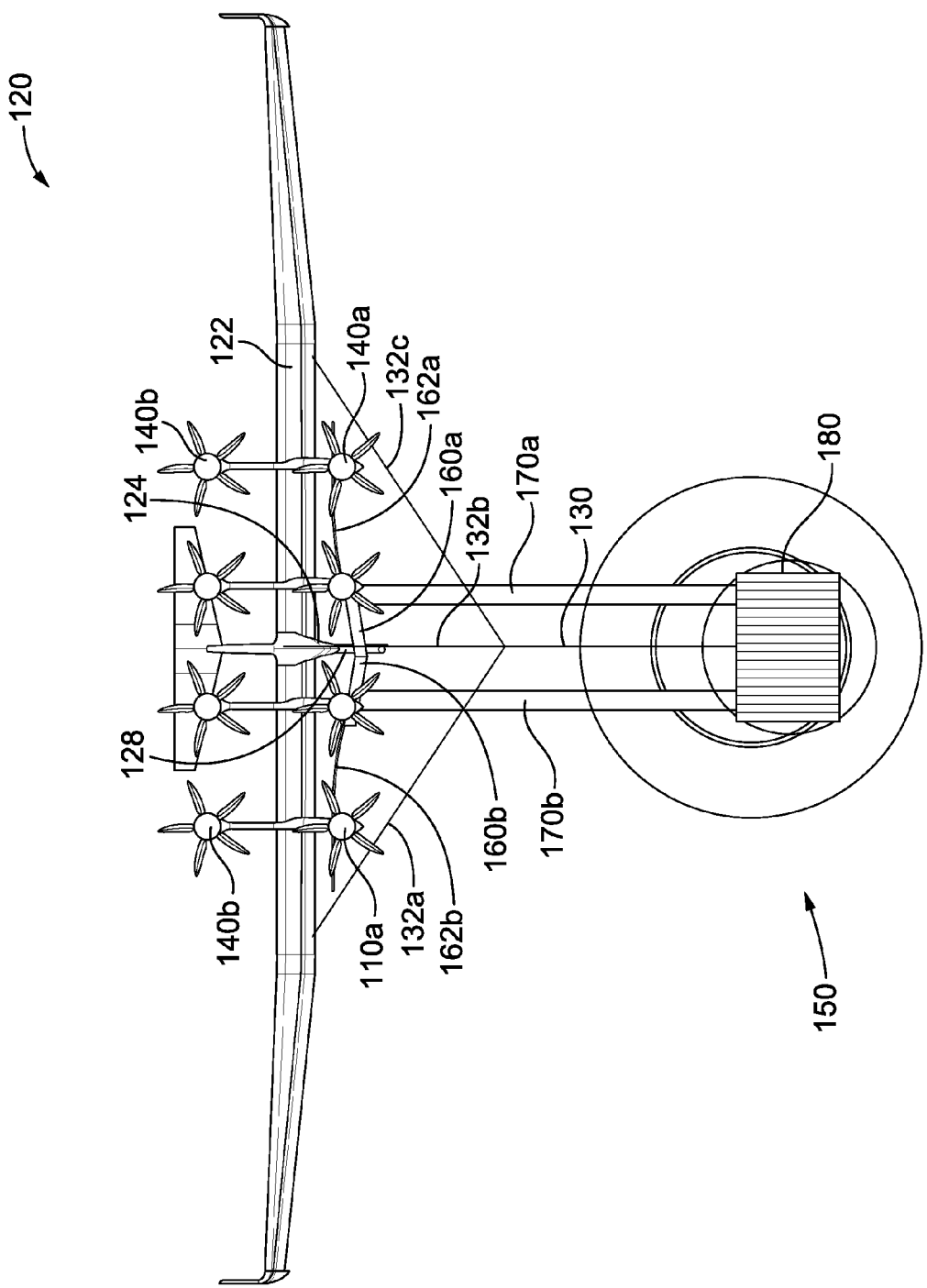
FIG. 4 is a top view of the aerial vehicle 120 and ground station 150 shown in FIG. 3, according to an example embodiment.

FIG. 3 is a side view of an airborne wind turbine including aerial vehicle 120 perched on perch panel 160 attached to ground station 150, and FIG. 4 is a top view of the aerial vehicle 120 and ground station 150 shown in FIG. 3, according to an example embodiment. In FIGS. 3 and 4, ground station 150 includes a tower 152 upon which rotatable drum 180 and levelwind 182 are positioned. In an embodiment, the tower 152 may be 15 meters in height. An electrically conductive tether 130 extends from the levelwind and is attached to wing 122 of aerial vehicle 120 using bridle lines 132a, 132b, and 132c. In one embodiment the bridle lines 132a, 132b, and 132c may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132a and 132c to better clear a larger sized perch panel.

The perch panel 160 is supported by perch panel support members 170a and 170b that extend horizontally from a perch platform 172 positioned on the ground station 150. The perch panel platform 172 may rotate about the top of the tower 52 so that the perch panel 160 is in proper position when the aerial vehicle is 120 is landing. Aerial vehicle 120 includes lower rotors 140a mounted on pylons 143 attached to wing 122 and upper rotors 140b mounted on pylons 143 attached to wing having propellers 145. In an embodiment, wing 122 is 4 meters long. Aerial vehicle includes a fuselage 124 having a curved section 129 to which a peg 28 is attached. In a perched condition, as shown in FIGS. 3 and 4, peg 28 contacts perch panel 160 constructed of a first side 160a and a second side 160b.

Furthermore, when the aerial vehicle 120 is in hover mode during landing, the peg 128 extends downwardly and outwardly from the fuselage 124 towards the perch panel 160. As shown in FIG. 4, the perch panel 160 may be aligned with the tether 130 being guided through levelwind 182 and onto a rotatable drum 180 that rotates about an axis 184 on ground station 150. In this manner, the perch panel 160 faces the fuselage 124 of the aerial vehicle 120 when it is landing. The drum 180 shown in FIGS. 3 and 4 has a vertical axis of rotation 184. However a horizontal drum or an angled drum could also be used. For example, if a drum rotatable about a horizontal axis is used, the perch platform 172 could be coupled to the drum such that the perch platform 172 extends perpendicularly from the axis of the drum and the tether 130 is wound onto the drum over the perch panel 160. In this manner as the tether 130 is wound onto the drum, the perch panel 130 will always face the aerial vehicle 120 and be in position to receive the peg 128 on the fuselage 124 of the aerial vehicle 120. In fact, the drum could be positioned on the perch platform 172 such that the tether 130 (or center tether bridle 132b) extends over the bottom of the groove 164 of the perch panel 160.

As seen in FIG. 4, a bar, such as a T-bar extends from both sides of the perch panel 160 as extensions 162a and 162b. A pair of hooks 126 may be attached to the main wing 122 positioned on opposite sides of the peg 128. Each hook 126 may be located at a point equidistant from the peg 128. The hooks 126 may be positioned on the wing or on the pylons that attach the rotors to the wing of the aerial vehicle. In an example embodiment, the hooks 126 are collinear with the bridle attachment points, or is in line with the bridles 132a and 132c at their point of attachment to the lower pylons 143. In one embodiment, the hooks 126 are located a distance from the bridle attachment points to the wing 122 that is within ¼ of the length of the perch peg 128 in the x body axis of the wing 122. The 128 peg may be positioned on the center of the fuselage 124 extending beneath the center tether bridle 132b during landing.

Once the aerial vehicle 120 comes into a final resting place on perch panel 160, there are four points of contact between the aerial vehicle 120 and the ground station 150 to provide a stable final perch for the aerial vehicle 120. In particular, the tether 130 remains attached to the wing 122 and the bridle 132a-c exerts a force on the aerial vehicle 120 pulling it towards the ground station 150. At the same time the perch panel 160 exerts a force against the peg 128 holding the aerial vehicle 120 tightly to the ground station 150. Further, the extending bars 162a and 162b contact the hooks 126 preventing the top of the aerial vehicle 120 from pitching towards the ground station 150. The weight of the aerial vehicle 120 concentrated at the points of contact between the pair of hooks 126 positioned on the extending bars 162a and 162b prevent the yawing or rolling of the aerial vehicle 120 in its final perched position, as shown in FIGS. 3 and 4. The perch panel 160 may have a height that is between 0.5 and 2 times the length of the perch peg 128 measured from the center of mass of the aerial vehicle 120.

Figure 5:
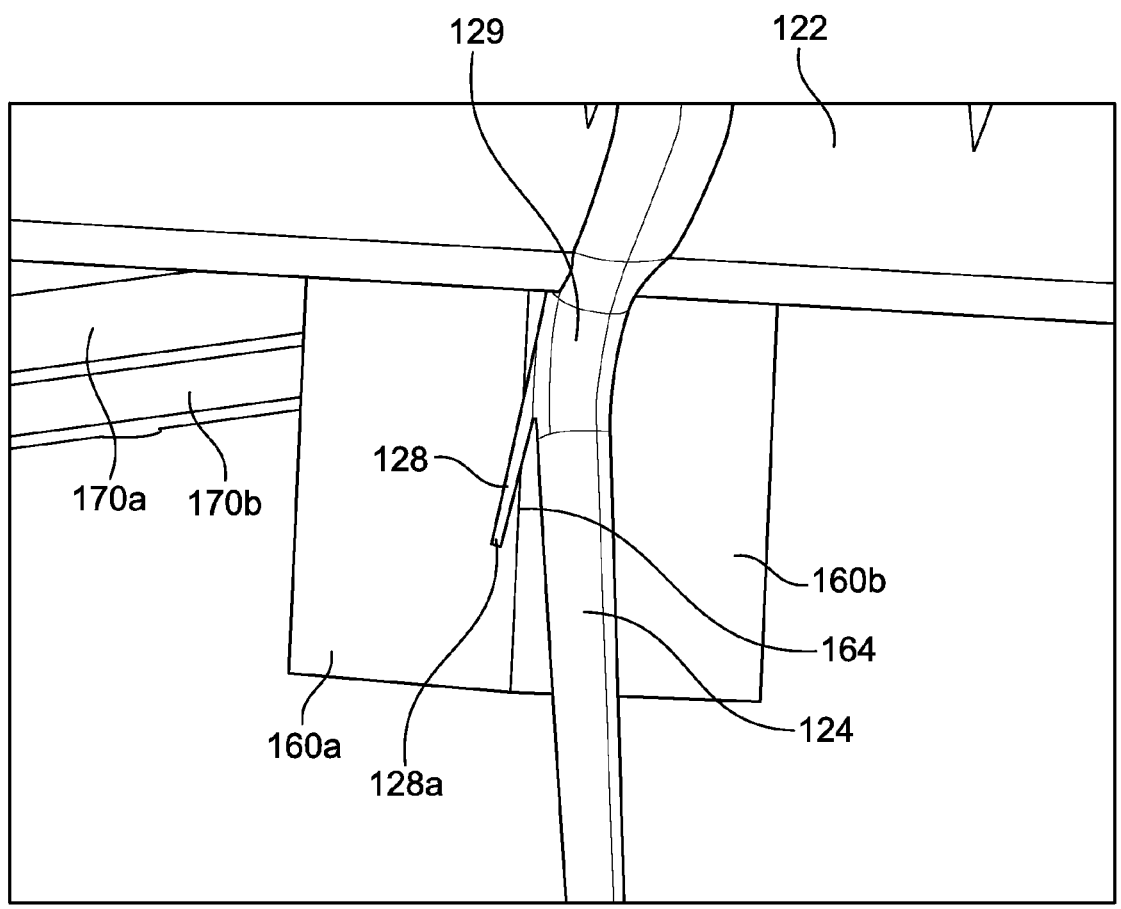
FIG. 5 is a perspective view of peg 128 extending from fuselage 124 and in contact with perch panel side 160*a*.

FIG. 5 is a perspective view of peg 128 extending from fuselage 122 and in contact with perch panel side 160a. As shown in FIG. 5, as the tether 130 is further wound onto the drum, the bottom 128a of the peg 128 comes into contact with the perch panel. The first and second sides 160a and 160b may have curved, or spherical surface sections that form a groove having a bottom 164 and the force of the peg 128 against the perch panel 160 forces the end 128a of the peg 128 down the curved surface of the side 160a of the perch panel 160 and towards bottom of the groove 164. In one embodiment, the peg 128 may not be attached at the center of the wing 122, but instead may be located off from the center of mass of the wing 122 to one side, closer to the inboard wingtip. The fuselage could also be moved to the side in this configuration.

Thus, as illustrated in FIG. 5, the peg 128 may not initially contact the bottom 164 of the groove as the aerial vehicle 120 is landing. Instead, the peg 128 may initially come into contact with the first or second side of the perch panel 160a and 160b. The force of the tether 130 pulling on the aerial vehicle 120 and the peg pressure against the panel resultant of the pitching moment created by the propellers of the aerial vehicle 120 will cause the bottom 128a of peg 128 to move across the curved surface of the side of the panel 160a as shown in FIG. 5 (that the bottom 128a of peg 128 initially contacted) and move down the curved surface of the perch panel side 160a into the bottom of the groove 164 on the perch panel 160. A rollerball or caster may be positioned on the bottom 128a of the peg 128 to provide a convenient way to make the peg 128 have lower friction at the point of contact with the perch panel 160 and make it easier for the bottom 128a of peg 128 to slide into the bottom of the groove 164.

During the critical period between initial contact of the peg 128 with the perch panel 160 and the contact between the pair of hooks 126 and the bars 162a and 162b extending from the perch panel 160, if there are windy, or gusty conditions, pitching or yawing of the aerial vehicle may be controlled during this critical period with the propellers of the rotors. For example, more or less power from the right or left rotors could be used to control yaw and more or less power from the lower or upper rotors could be used to control pitch.

Figure 12A:
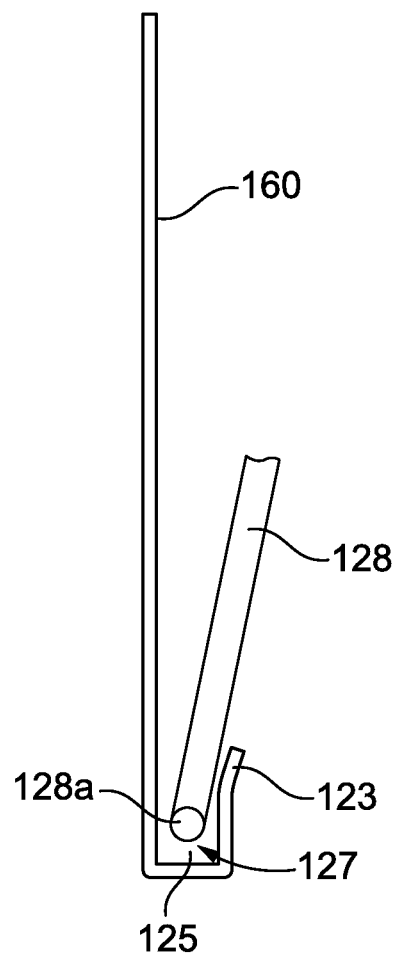
FIG. 12A is a side view of peg 128 positioned within a slot 127 at the bottom of perch panel 160, according to an example embodiment.
Figure 12B:
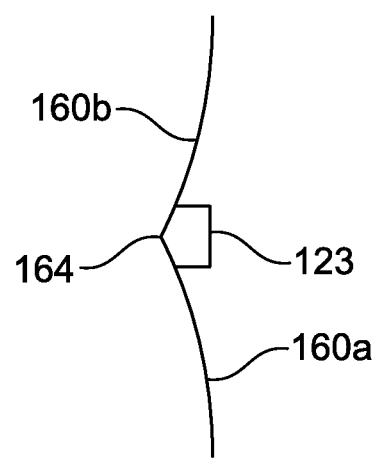
FIG. 12B is a side view of the peg 128 and perch panel 160 shown in FIG. 12A.

In addition, as shown in FIGS. 12A and 12B, a lip 123 may be positioned at the bottom of perch panel sides 160a and 160b of the perch panel 160 to form a slot 127 into which the bottom 128a of peg 128 slides into. With this configuration, for the peg 128 to disengage from the perch panel 160 (or hooks 126 to disengage from bars 162a or 162b), the wing 122 of the aerial vehicle 120 would be required to be lifted up to clear the lip 123 for disengagement to occur. The use of the lip 123 would also reduce the load on the tether 130 and bridles 132a-c. As shown in FIG. 12A, the bottom of the peg 128a does not contact the bottom 125 of slot 127 as the hooks 126 contact the perch panel extensions before the bottom of the peg 128a hits. Furthermore, once the peg 128 is positioned within the slot 127, the wing 122 cannot be pitched up once it has landed fully on the perch panel 160.

As shown in FIG. 12B, the lip 123 may be narrow to convey loads in moment about the body Z axis into the peg 128, thereby helping to avoid excess loads on the hooks 126 when the spacing between the hooks 126 is narrow. This is useful to minimize loads from side gusts hitting the rudder of the aerial vehicle 120. Moreover, a latching mechanism (not shown) positioned either on the peg 128 or on the hooks 126 could be used to prevent the wing 122 from being lifted off the perch panel 160. Such a latching mechanism may be important for storm loads.

Figure 12C:
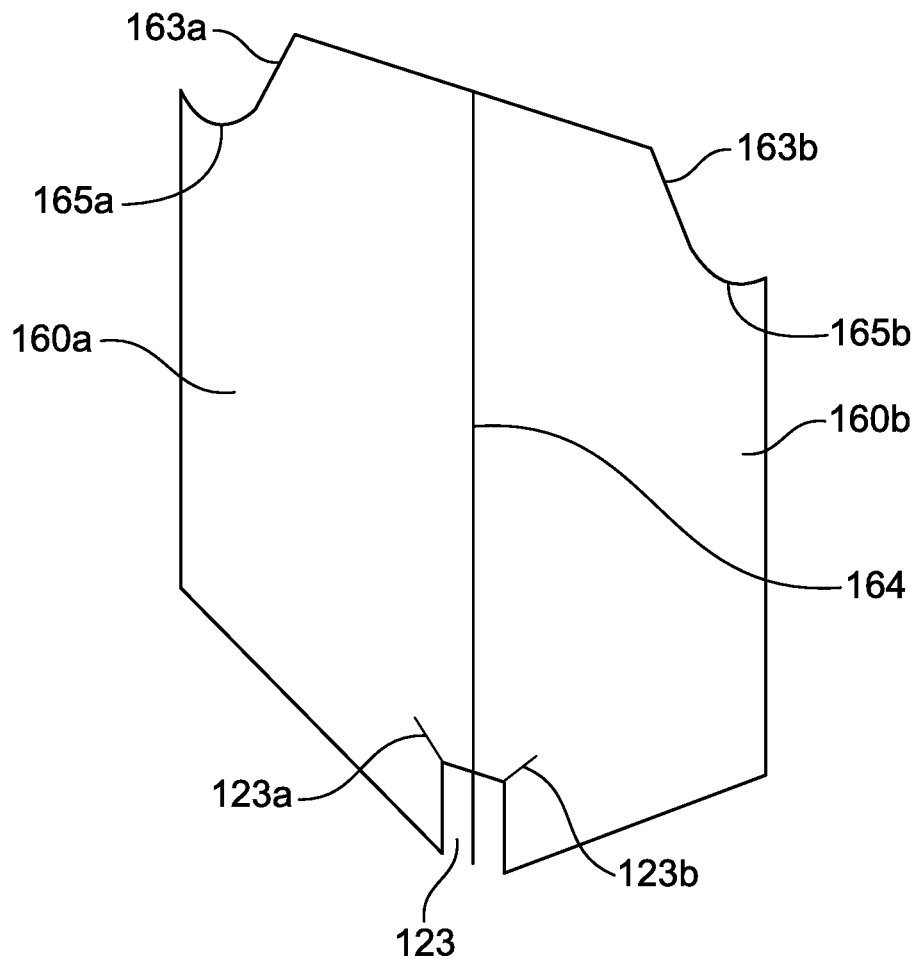
FIG. 12C is a front view of perch panel 160 shown in FIGS. 12A and 12B

FIG. 12C is a front view of perch panel 160 shown in FIGS. 12A and 12B. Bottom of the groove 164 is shown extending between first side 160a and second side 160b of the perch panel 160. Lip 123 is shown having angled upper portions 123a and 123b that may serve to direct the end of the peg 128a (shown in FIG. 12A) into the slot. The top of the perch panel includes a first angled edge 163a and a second angled edge 163b that guide the hooks 126 (not shown) down onto final hook resting positions 165a and 165b.

The peg 128 is preferably located at or near the center of gravity of the aerial vehicle 120, such as at a point located at or near the intersection of the axes of pitch, roll, and yaw. As a result, there will be little or no movement of the peg 128 during pitch, roll, or yaw of the aerial vehicle 120. Therefore, there will be little or no movement of the aerial vehicle 120 at its point of contact with the perch panel 120, i.e. the bottom 128a of peg 128.

Figure 6:
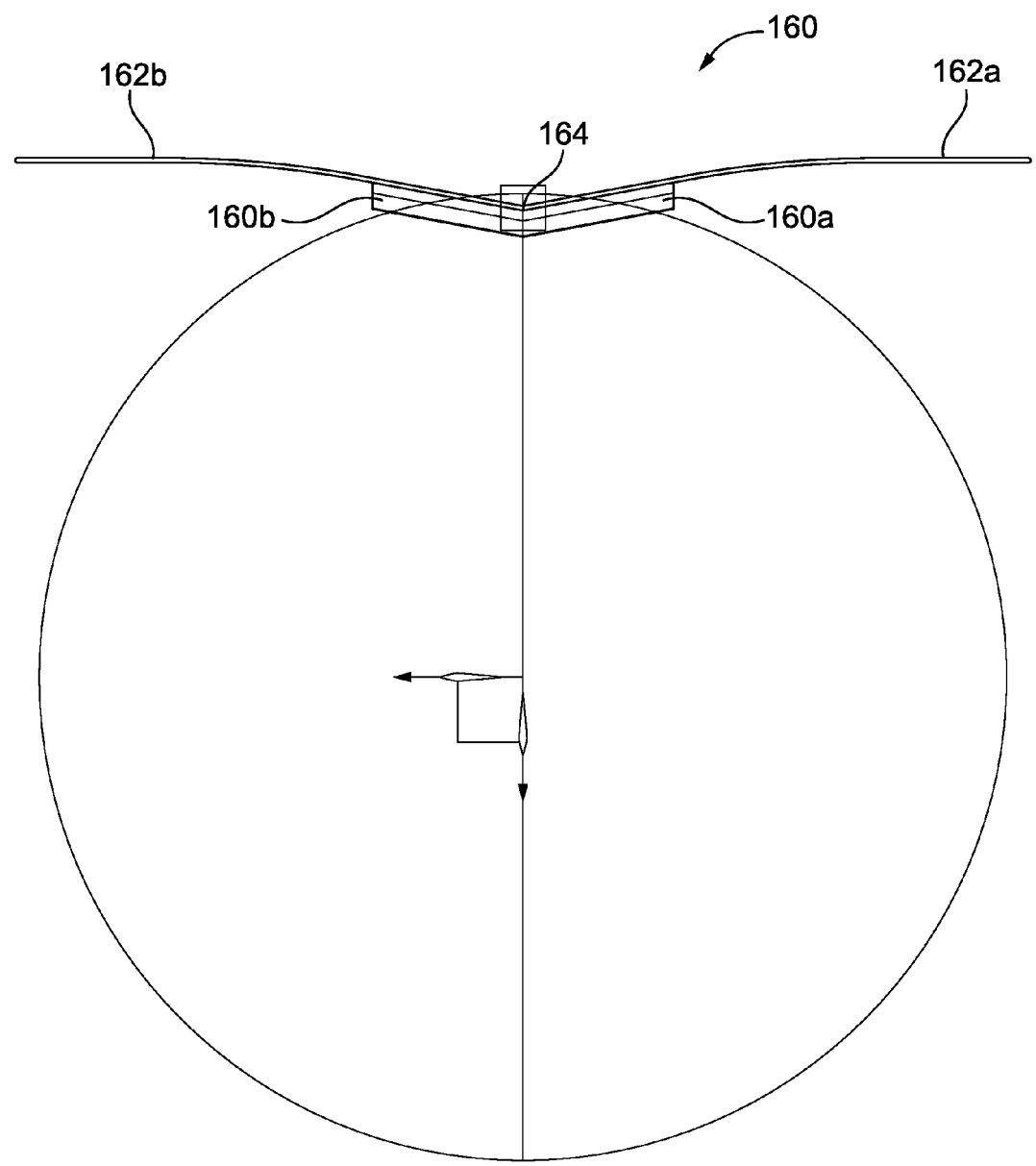
FIG. 6 is a top view of perch panel 160 shown in FIGS. 3-5.

FIG. 6 is a top view of perch panel 160 shown in FIGS. 3-5. In FIG. 6, the perch panel 160 is positioned about a sphere. Perch panel 160 includes curved sides 160a and 160b that intersect at the bottom of groove 164. The sides 160a and 160b may be curved or angled inwardly to allow the peg 128 to move downwards towards the bottom of groove 164. In some embodiments the sides 160a and 160b may be shaped as the surface of a sphere, or simply curved. In other embodiments, the sides 160a and 160b may be flat and angled inwardly towards bottom of groove 164. Bars 162a and 162b extend from the top of sides 160a and 160b to provide a place for the hooks 126 of the aerial vehicle 120 to be placed.

Figure 7:
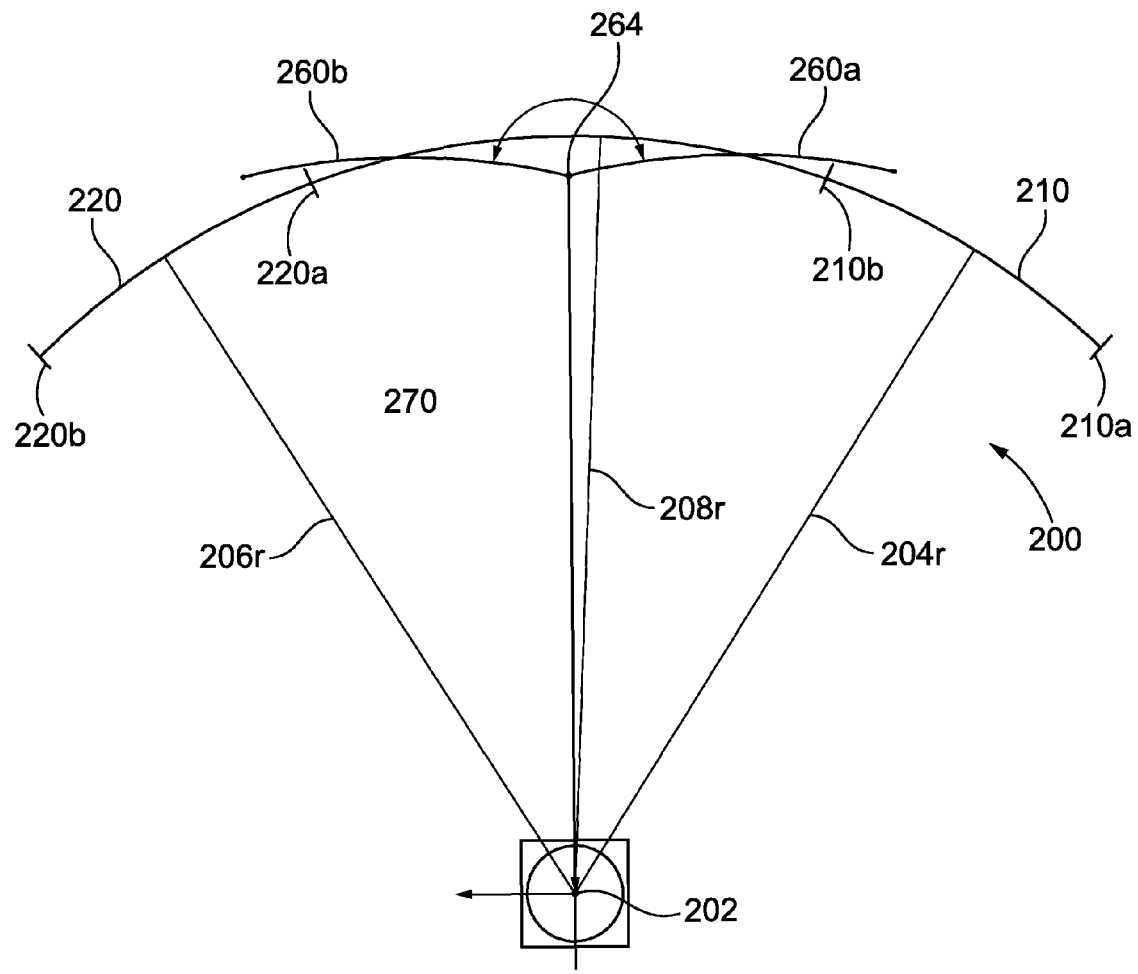
FIG. 7 is a diagram demonstrating a possible geometry of perch panel 160 shown in FIGS. 3-6 with respect to sphere 200.

FIG. 7 is a diagram demonstrating a possible geometry of perch panel 160 shown in FIGS. 3-6 with respect to sphere 200. In particular, sphere 200 has a center 202 and includes a first sphere surface 210 extending between points 210a and 210b and having a radius 204R. Sphere 200 includes a second sphere surface 220 extending between points 220a and 220b having a radius 206R equal in length to radius 204R. Sphere surfaces 210 and 220 may be rotated about sphere center 202 towards each other until they come into contact as shown in position 260a and 260b, forming a flattened V-shaped groove having a bottom 264 positioned at the end of radius 270.

The aerial vehicle 120 shown in FIGS. 3-6 may be viewed as sitting on a sphere when positioned on the perch panel 160.

The first and second sides of the perch panel may be formed as disparate surface sections of a sphere that have been brought into contact to provide a vertically oriented V-shaped groove having a bottom where the inner edges of the first and second sides of the panel are joined. In this manner, a perch panel, such as perch panel 160 shown in FIGS. 3-6, may include a first side and a second side having curved surfaces that intersect to form a groove having a bottom where the first and second sides intersect.

Figure 8:
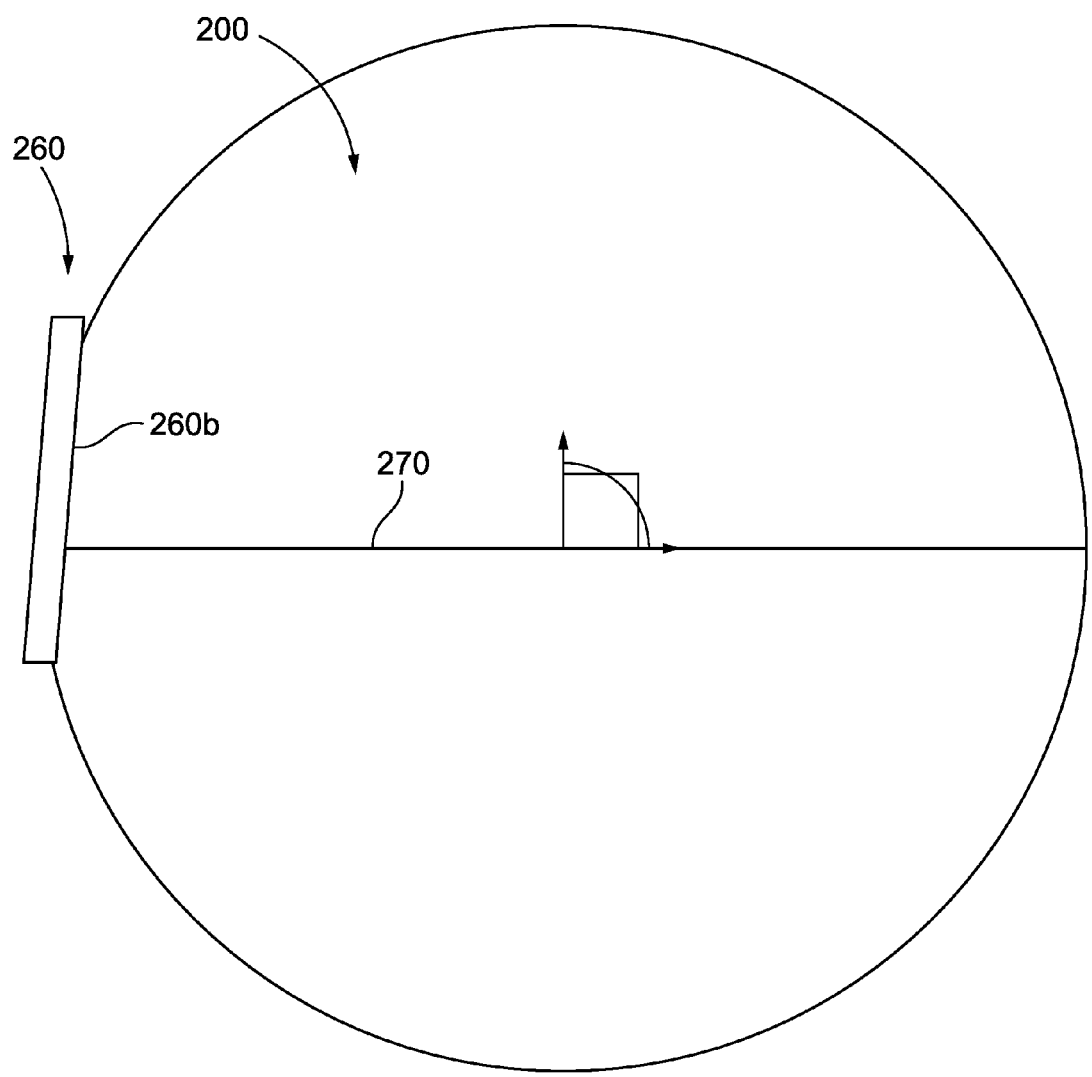
FIG. 8 is a diagram of a side view of the perch panel 160 demonstrating a possible geometry of perch panels 160a and 160b shown in FIGS. 3-6.

FIG. 8 is a diagram of a side view of the perch panel 160 demonstrating the geometry of perch panels 160a and 160b shown in FIGS. 3-6. In FIG. 8, the perch panel is depicted as perch panel 260 positioned about sphere 200. Side 260b is shown extending from a center of sphere 200 with a radius 270. The perch panel 260 has a leanback angle. In the ideal case the perch panel would be close to a section of a sphere as demonstrated in FIG. 7. However, because the constraint problem is less severe with regard to wing pitch, this curvature of the perch panel 260 may be flattened for manufacturability.

Figure 9:
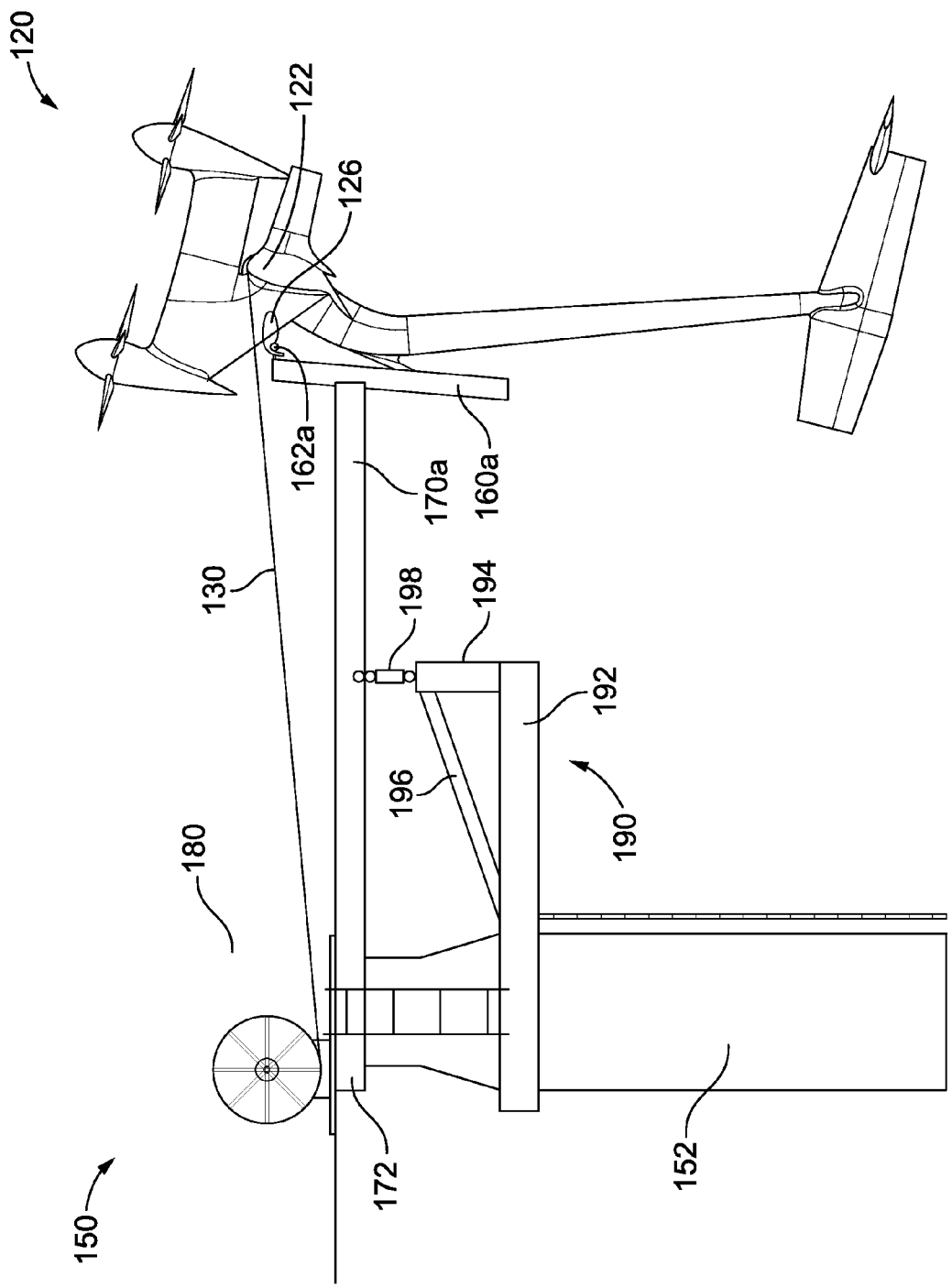

FIG. 9 shows a side view of aerial vehicle 120 perched on perch panel 160 attached to ground station 150 as shown in FIG. 3, with drum 180 and levelwind 182 positioned on tower 152 and perch support 170 extending to side 160a of the perch panel. Aerial vehicle 120 is shown perched on the perch panel with hooks 126 resting atop bar 162a. In some embodiments it may be desirable to provide a more compliant perch system. In particular, if the aerial vehicle 120 comes in for a "hard landing" it may be desirable for the perch panel 160 to absorb the energy from the aerial vehicle 120 during such a hard landing. To provide for a more compliant perch system, the perch panel 160 may be supported by one or more cantilevered beams 170a, so that the perch panel 160 is not supported underneath. The cantilevered beams 170a may flex somewhat upon impact to absorb energy during a hard landing.

However, additional cushioning may also be provided in the perch panel system. For example, as shown in FIG. 9, a truss 190 may extend beneath perch support 170a. The truss 190 may be rotatable with the perch platform about tower 152. The truss 190 may be formed of horizontal member 192 vertical member 194 and cross member 196. The truss 190 extends beneath perch support 170a. A shock absorbing device 198 is positioned beneath perch support 170a and on top of truss 190 to provide for further cushioning during a hard landing. Alternately, a cantilevered beam could be used to support the shock absorbing device instead of a truss.

Figure 10:
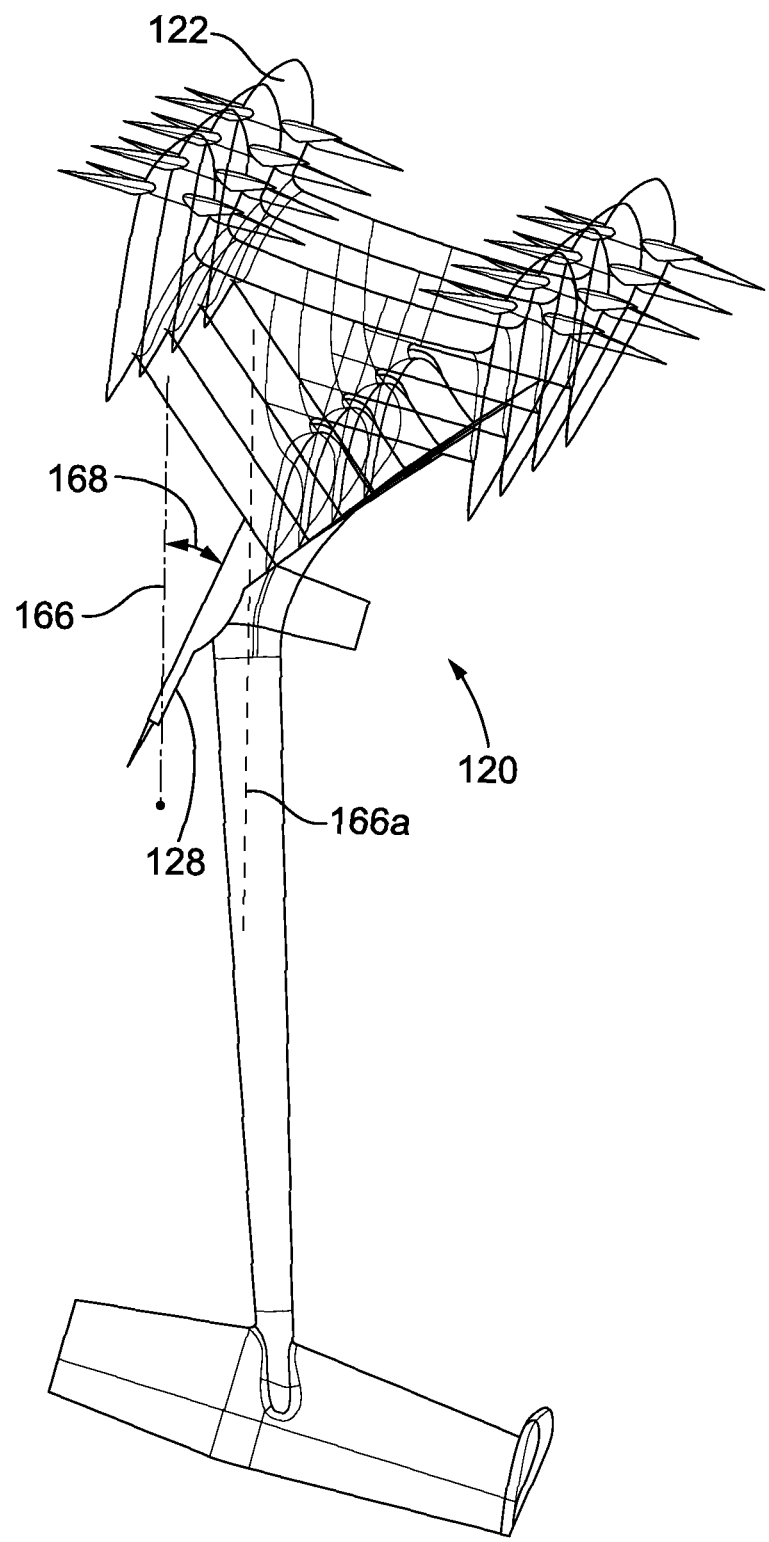
FIG. 10 is a perspective side view of aerial vehicle 120 shown in a perched position demonstrating the angular positioning of peg 128 with respect to body x axis of wing 122, according to an example embodiment.

FIG. 10 is a perspective side view of aerial vehicle 120 shown in a perched position demonstrating the angular positioning of peg 128 with respect to body x axis 166a of wing 122. The perch peg 128 is not aligned with the body x axis 166a of the wing 122. It has some declination. The ideal declination is 0 degrees as this yields the lowest friction force on the peg 128, but for the sake of not having the wing 122 and the perch panel interfere, the peg 128 generally is declined at an angle 168 (shown from line 166 that is parallel to x body axis 166a) that is 10-40 degrees below the body x axis 166a. In an embodiment, the length of the perch peg 128 may be between 0.5 and 2 times the radius of gyration for the pitch axis of the aerial vehicle 120.

Figure 11:
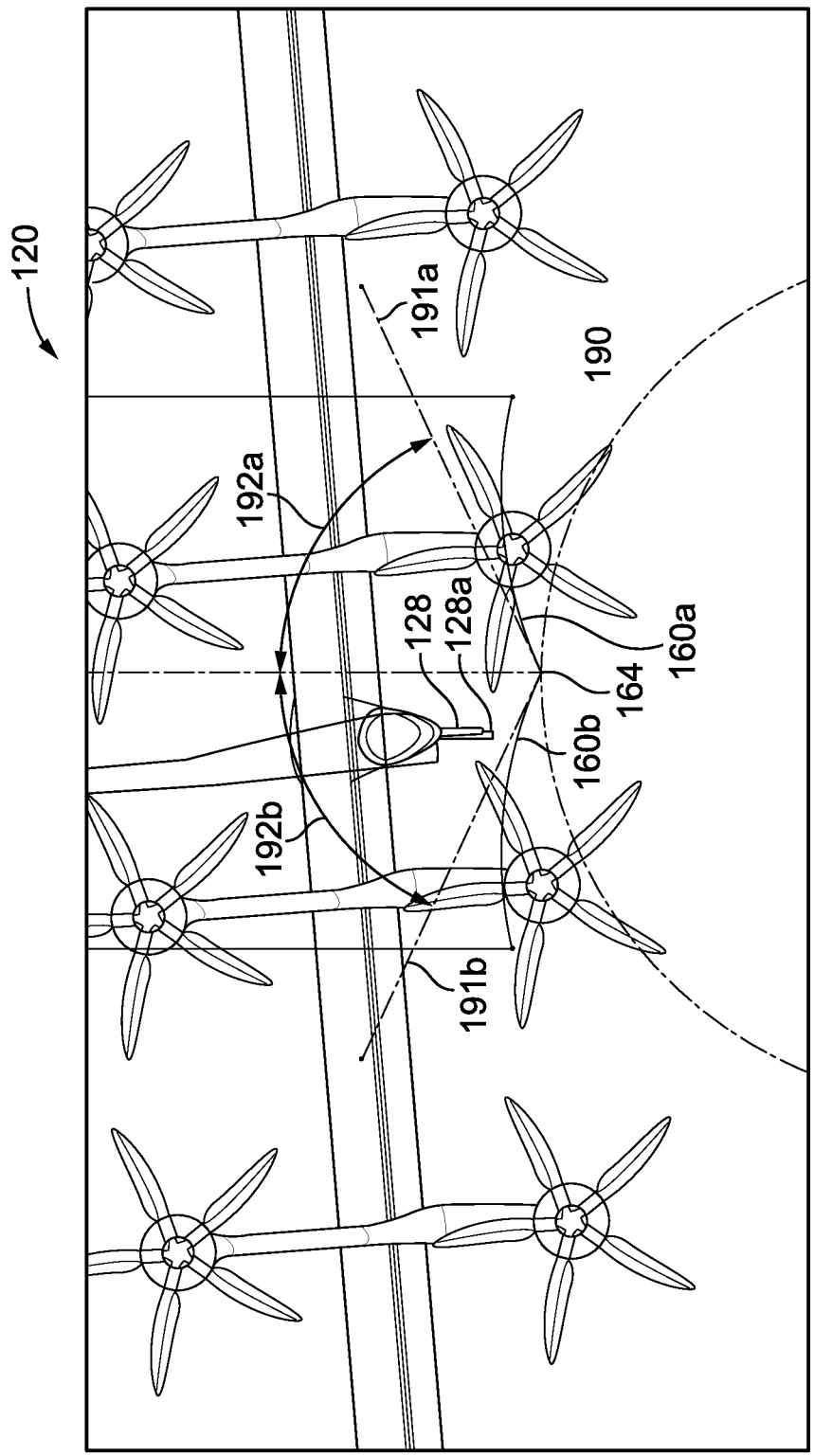
FIG. 11 is a top view of aerial vehicle 120 with bottom 128a of peg 128 about to contact side of perch panel 160b during landing, demonstrating the angle of departure of perch side panels 160a and 160b.

FIG. 11 is a top view of aerial vehicle 120 with bottom 128a of peg 128 about to contact perch panel side 160b during landing, demonstrating the angle of departure of perch panel sides 160a and 160b. The departure angle from the circle 190 centered at the pivot of the tether, from bottom of groove 164 where the arcs of curved perch panel sides 160a and 160b pass through the perch peg contact point (bottom of groove 164), defines the restoring of the stiffness of the perch. This angle is generally 10-30 degrees, although in some embodiments the side of the perch panels make a departure angle of 5-30 degrees from a circle about the pivot point of the tether. In some cases, the departure angle on the two sides may be different.

In FIG. 11, the departure angle of perch panel side 160a depicted with line 191a is defined as 90 degrees minus angle 192a, and the departure angle of perch panel side 160b depicted with line 191b is defined as 90 degrees minus angle 192b. In FIG. 11, the departure angles of lines 191a and 191b are the same. Shallow angles actually have the advantage of reducing instantaneous forces on the wing of the aerial vehicle 120 because there is some compliance and the peg 128 can slide around on the perch panel 160.

4. EXAMPLE METHOD OF LANDING AN AERIAL VEHICLE ON AN AIRBORNE WIND TURBINE

Figure 13:
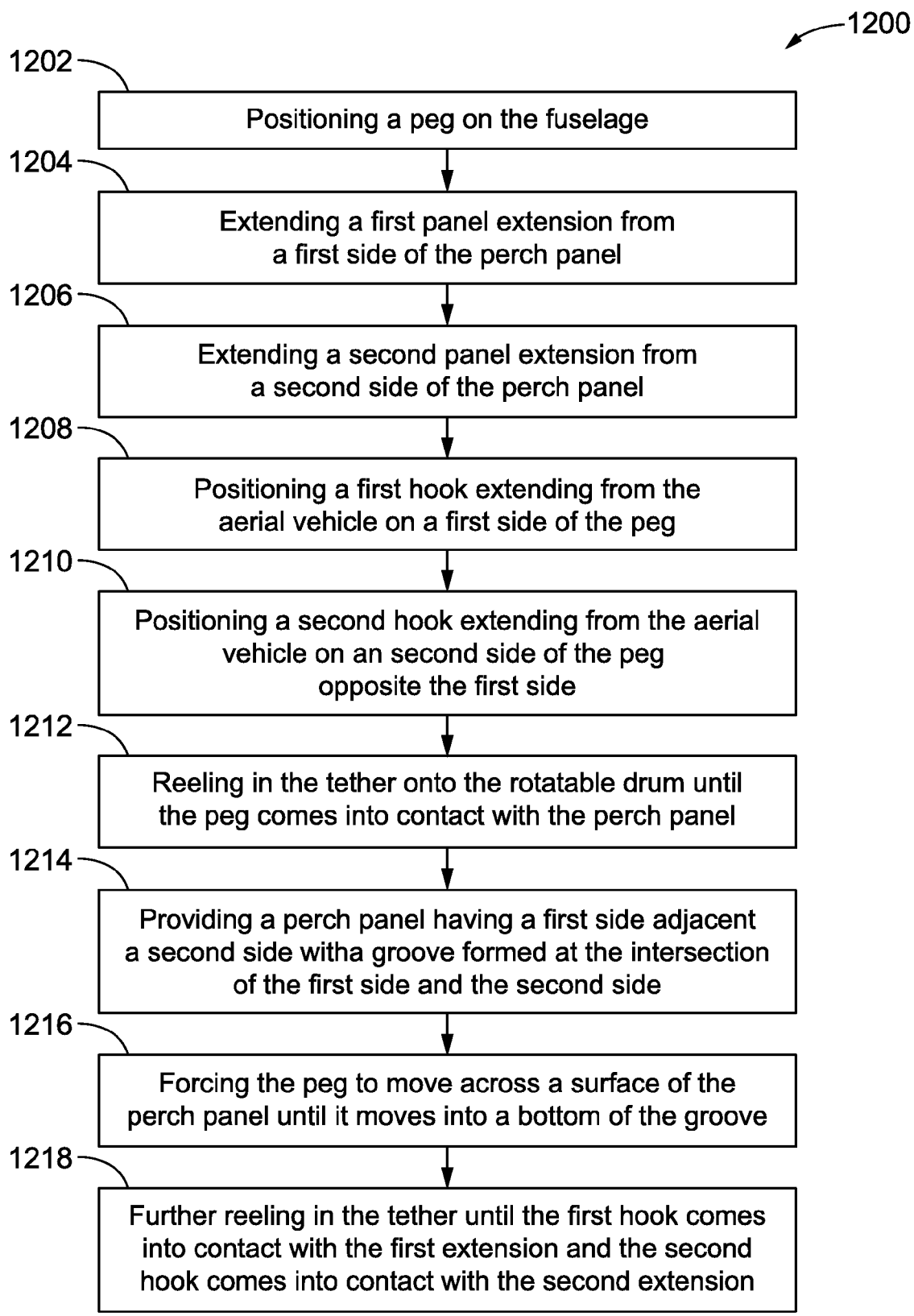
FIG. 13 is a method, according to an example embodiment.

FIG. 13 shows a method 1200 that may be used for landing an aerial vehicle on an airborne wind turbine system having an aerial vehicle having a fuselage, an electrically conductive tether having a first end secured to the aerial wing and a second end secured to a platform, a rotatable drum positioned on the platform onto which the tether is wrapped when the aerial vehicle is reeled in, a perch panel extending from the platform, where the platform is positioned on a tower, comprising the step 1202 of positioning a peg on the fuselage, the step 1204 of extending a first panel extension from a first side of the perch panel, the step 1206 of extending a second panel extension from a second side of the perch panel, the step 1208 of positioning a first hook extending from the aerial vehicle on a first side of the peg, and the step 1210 of positioning a second hook extending from the aerial vehicle on an second side of the peg opposite the first side.

The method 1200 may further include the step 1212 of reeling in the tether onto the rotatable drum until the peg comes into contact with the perch panel, the step 1214 of providing a perch panel having a first side adjacent a second side with a groove formed at the intersection of the first side and the second side, the step 1216 of forcing the peg to move across a surface of the perch panel until it moves into a bottom of the groove, and the step 1218 of descending the aerial vehicle until the first hook comes into contact with the first extension and the second hook comes into contact with the second extension. In an embodiment, the tether may be reeled in until the peg touches the panel, then reeled in slightly farther to a determined position, and then the aerial vehicle descends to engage the first and second hooks.

5. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An airborne wind turbine system, comprising:
   an aerial vehicle having a fuselage;
   an electrically conductive tether having a first end secured to the aerial vehicle and a second end secured to a platform;
   a rotatable drum positioned on the platform onto which the tether is wrapped when the aerial vehicle is reeled in;
   a perch panel extending from the platform;
   a first extension extending from a first side of the perch panel;
   a second extension extending from a second side of the perch panel;
   a peg positioned on the fuselage;
   a first hook extending from the aerial vehicle on a first side of the peg;
   a second hook extending from the aerial vehicle on a second side of the peg opposite the first side;
   wherein when the aerial vehicle is perched on the perch panel, the peg is in contact with the perch panel, the first hook is positioned over the first extension, and the second hook is positioned over the second extension.

2. The system of claim 1, wherein the first hook is attached to a first rotor pylon and the second hook is attached to a second rotor pylon.

3. The system of claim 1, wherein the perch panel has a first side adjacent a second side that form a groove having a bottom at an intersection between the first side and the second side.

4. The system of claim 3, wherein the groove extends vertically.

5. The system of claim 3, wherein the first side has a curved surface extending towards the bottom of the groove and the second side has a curved surface extending towards the bottom of the groove.

6. The system of claim 3, wherein the first and second sides of the perch panel have a 5-30 degree departure angle from a circle about a pivot point of the tether.

7. The system of claim 1, wherein the peg is located on a curved section of the fuselage and extends from the fuselage declined at an angle 10-40 degrees below a body x axis of a main wing of the aerial vehicle.

8. The system of claim 1, wherein the peg is located at a center of gravity of the aerial vehicle.

9. The system of claim 1, wherein the first extension and second extension comprise bars.

10. The system of claim 1, wherein the tether is attached to a center bridle line that extends over the perch panel when the aerial vehicle is perched on the perch panel.

11. The system of claim 1, wherein the rotatable drum has a horizontal axis of rotation, and the rotatable drum is coupled to the platform and rotatable with the platform about a top of a tower, and wherein the perch panel extends perpendicularly from the axis of rotation of the drum.

12. The system of claim 11, wherein a truss is secured to the platform and extends beneath a perch support that extends between the platform and the perch panel, and wherein a shock absorbing device is positioned between the perch support and the truss.

13. The system of claim 1, wherein the peg has a length that is between 0.5 and 2 times a radius of gyration for a pitch axis of the aerial vehicle.

14. The system of claim 1, wherein the perch panel has a height that is between 0.5 and 2 times a length of the perch peg measured from a center of mass of the aerial vehicle.

15. The system of claim 1, wherein the first and second hooks are located a distance from a bridle attachment point to the wing that is within ¼ of the length of the perch peg in the x body axis of the aerial vehicle.

16. An aerial vehicle for use in an airborne wind turbine system, comprising:
   a main wing;
   a fuselage attached to the main wing;
   a peg positioned on the fuselage;
   a first hook extending from the aerial vehicle on a first side of the peg;
   a second hook extending from the aerial vehicle on a second side of the peg opposite the first side;
   wherein the peg is adapted for contacting a perch panel extending from a platform when the aerial vehicle is a perched position;
   wherein the first hook is adapted for positioning on a first extension extending from a first side of the perch panel when the aerial vehicle is in the perched position; and
   wherein the second hook is adapted for positioning on a second extension extending from a second side of the perch panel when the aerial vehicle is in the perched position.

17. The aerial vehicle of claim 16, wherein the peg is located on a curved section of the fuselage and extends from the fuselage declined at an angle 10-40 degrees below a body x axis of a main wing of the aerial vehicle.

18. The aerial vehicle of claim 16, wherein the first hook is attached to a first rotor pylon and the second hook is attached to a second rotor pylon.

19. A perching system for use in an airborne wind turbine system, comprising:
   a perch platform;
   a perch panel extending from the perch platform;
   a first extension extending from a first side of the perch panel;
   a second extension extending from a second side of the perch panel;
   wherein the perch panel is adapted to contact a peg extending from an aerial vehicle when the aerial vehicle is in a perched position;
   wherein the first extension is adapted to contact a first hook extending from the aerial vehicle on a first side of the peg when the aerial vehicle is in the perched position; and
   wherein the second extension is adapted to contact a second hook extending from the aerial vehicle on a second side of the peg opposite the first side, when the aerial vehicle is in the perched position.

20. The perching system of claim 19, wherein the perch panel has a first side adjacent a second side that form a groove having a bottom at an intersection between the first side and the second side.

21. The perching system of claim 20, wherein the first side has a curved surface extending towards the bottom of the groove and the second side has a curved surface extending towards the bottom of the groove.

22. A method of landing an aerial vehicle in an airborne wind turbine system including an aerial vehicle having a fuselage, an electrically conductive tether having a first end secured to the aerial vehicle and a second end secured to a platform, a rotatable drum positioned on the platform onto which the tether is wrapped when the aerial vehicle is reeled in, a perch panel extending from the platform, comprising the steps of:
   positioning a peg on the fuselage;
   extending a first panel extension from a first side of the perch panel;
   extending a second panel extension from a second side of the perch panel;

positioning a first hook extending from the aerial vehicle on a first side of the peg;
positioning a second hook extending from the aerial vehicle on an second side of the peg opposite the first side;
reeling in the tether onto the rotatable drum until the peg comes into contact with the perch panel; and
descending the aerial vehicle until the first hook comes into contact with the first extension and the second hook comes into contact with the second extension.

23. The method of claim 22, wherein the perch panel has a first side adjacent a second side that form a groove having a bottom at an intersection between the first side and the second side, and further including the step of:
causing the peg to move across a surface of the perch panel until it moves into the bottom of the groove.

24. The method of claim 23, wherein the first side has a curved surface extending towards the bottom of the groove and the second side has a curved surface extending towards the bottom of the groove.

25. The method of claim 23, further including the step of further reeling in the tether to a determined position after the peg contacts the perch panel.

\* \* \* \* \*